(12) United States Patent
Otsuka

(10) Patent No.: US 8,973,988 B2
(45) Date of Patent: Mar. 10, 2015

(54) VEHICLE SEAT

(75) Inventor: Taiyo Otsuka, Toyota (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 882 days.

(21) Appl. No.: 12/904,569

(22) Filed: Oct. 14, 2010

(65) Prior Publication Data

US 2011/0101759 A1 May 5, 2011

(30) Foreign Application Priority Data

Nov. 4, 2009 (JP) .................................. 2009-252822

(51) Int. Cl.
*B60N 2/42* (2006.01)
*B60N 2/48* (2006.01)
*B60N 2/427* (2006.01)
*B60N 2/68* (2006.01)
*B60N 2/70* (2006.01)

(52) U.S. Cl.
CPC ............ *B60N 2/4885* (2013.01); *B60N 2/4228* (2013.01); *B60N 2/42709* (2013.01); *B60N 2/42745* (2013.01); *B60N 2/68* (2013.01); *B60N 2/7094* (2013.01)
USPC ................... 297/216.12; 297/391; 297/452.18

(58) Field of Classification Search
USPC ................................. 297/216.12, 391, 216.13
See application file for complete search history.

(56) References Cited

U.S. PATENT DOCUMENTS

| | | | |
|---|---|---|---|
| 5,509,716 A * | 4/1996 | Kolena et al. ............ | 297/216.13 |
| 2006/0006709 A1 * | 1/2006 | Uno et al. ................. | 297/216.12 |
| 2006/0202524 A1 * | 9/2006 | Yamaguchi ............... | 297/216.12 |
| 2006/0279120 A1 * | 12/2006 | Fujita et al. ................ | 297/284.2 |
| 2008/0073951 A1 * | 3/2008 | Hattori et al. ............ | 297/216.12 |

FOREIGN PATENT DOCUMENTS

| | | |
|---|---|---|
| CN | 201092270 | 7/2008 |
| JP | 2000-210156 | 8/2000 |
| JP | 2006-224847 | 8/2006 |
| JP | 2007-507389 | 3/2007 |
| JP | 2007-091175 | 4/2007 |
| JP | 2007-269100 | 10/2007 |
| WO | 2005/032880 | 4/2005 |

OTHER PUBLICATIONS

China Office action, dated May 3, 2012, along with an English-language translation thereof.

(Continued)

*Primary Examiner* — Sarah B McPartlin
(74) *Attorney, Agent, or Firm* — Greenblum & Bernstein, P.L.C.

(57) ABSTRACT

In a vehicle seat that has a seat back and a headrest attached to an upper portion of the seat back, the seat back has an upper frame member that extends in the width direction at an upper portion. The upper frame member and the headrest are structured such that a second distance is greater than a first distance. The first distance is a horizontal distance, between a front surface first portion of the headrest and a head of a head restraint measuring device (HRMD) that is attached to an H-point device seated in the seat, that has been measured by the head restraint measuring device. The second distance is a horizontal distance between the front surface first portion of the headrest and a front surface of the upper frame member that is positioned to the rear of the front surface first portion.

10 Claims, 6 Drawing Sheets

(56) References Cited

OTHER PUBLICATIONS

U.S. Appl. No. 12/904,583 to Taiyo Otsuka, which was filed Oct. 14, 2010.

Japanese Office Action in counterpart Application No. JP2009-252822 issued on Sep. 10, 2013 (with partial English-language translation).

* cited by examiner

F I G . 5
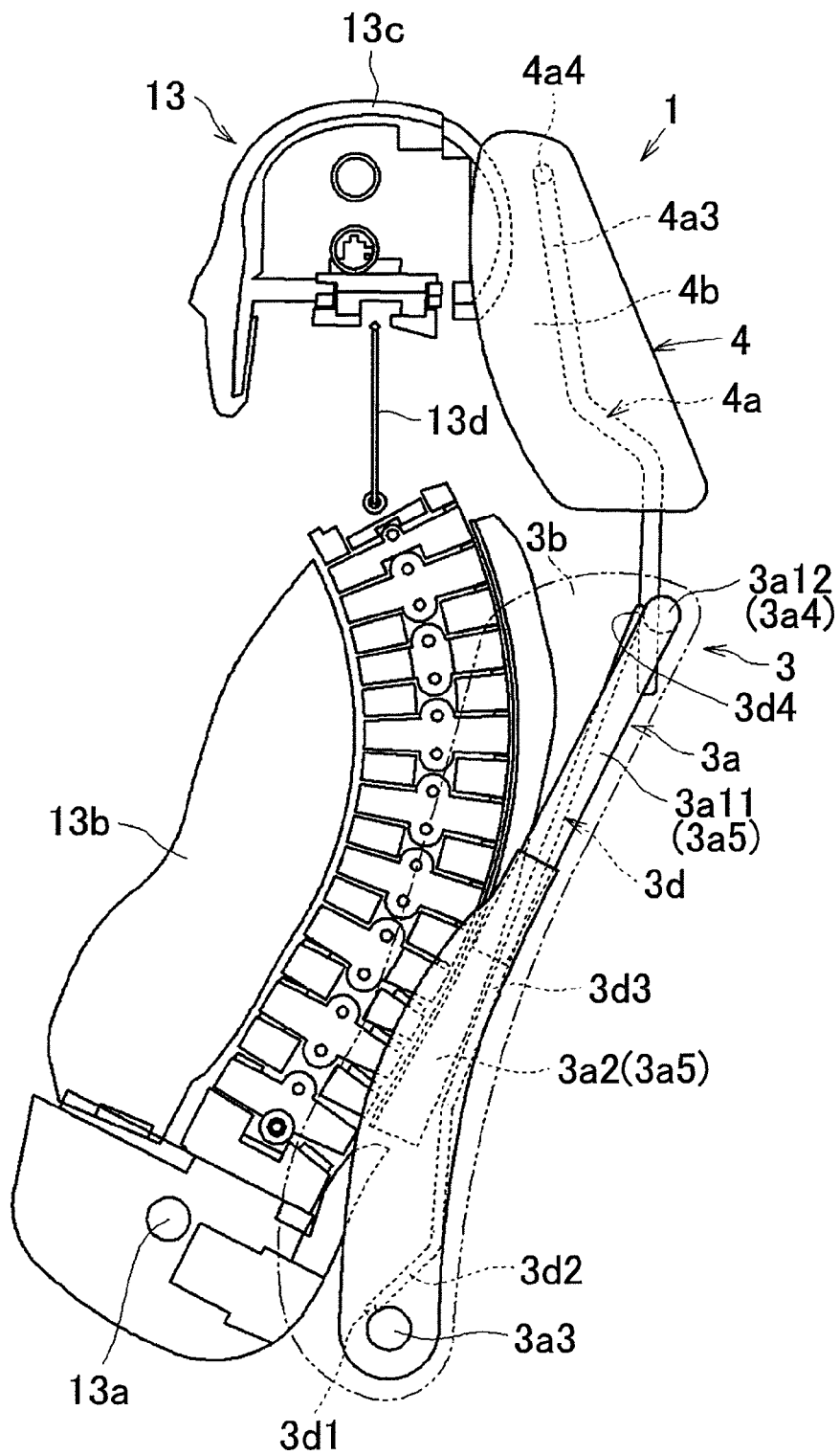

VEHICLE SEAT

INCORPORATION BY REFERENCE

The disclosure of Japanese Patent Application No. 2009-252822 filed on Nov. 4, 2009 including the specification, drawings and abstract is incorporated herein by reference in its entirety.

BACKGROUND OF THE INVENTION

1. Field of the Invention

The invention relates to a vehicle seat mounted in a vehicle such as an automobile.

2. Description of the Related Art

A vehicle seat typically has a seat back and a headrest. The seat back and the headrest each have a frame and a pad that is attached to the frame. The seat back and the headrest conventionally have various shapes. For example, Published Japanese Translation of PCT application No. 2007-507389 (JP-A-2007-507389) describes a seat back and headrest in which the back distance between the frame of the seat back and the back of the user is substantially the same as the head distance between the frame of the headrest and the head of the user. As a result, when the vehicle is struck from behind (i.e., during a rear impact), the head and torso of the user are restrained at substantially the same instant by the frame of the seat back and the frame of the headrest, so it can be suppressed that the user suffers whiplash.

SUMMARY OF INVENTION

However, there is still a need for a vehicle seat capable of mitigating whiplash to the user. Therefore, this invention provides a vehicle seat capable of more effectively mitigating whiplash to the user.

In a first aspect of the invention, a seat back has an upper frame member that extends in the width direction at an upper portion. The upper frame member and a headrest are structured such that a second distance is greater than a first distance. The first distance is a horizontal distance, between a front surface first portion of the headrest and a head of a head restraint measuring device that is attached to an H-point device seated in the seat, that has been measured by the head restraint measuring device. The second distance is a horizontal distance between the front surface first portion of the headrest and a front surface of the upper frame member that is positioned to the rear of the front surface first portion.

Therefore, the distance between the headrest and the head of a user seated in the seat can be assumed by the first distance. That is, the head of the head restraint measuring device can be assumed to be the head of the user. The distance between the upper frame member and the upper portion of the torso of the user is determined by the second distance. That is, the back surface of the upper portion of the torso of the user is substantially the same as the position in the front-rear direction of the front surface first portion of the headrest. Therefore, the second distance can be assumed to be the distance between the upper frame member and the upper portion of the torso.

During a rear impact, the user moves substantially horizontally (toward the rear) relative to the seat due to inertia force. Therefore, the head of the user moves from an initial position in front of the headrest and strikes the front surface of the headrest. The torso of the user moves from an initial position in which a portion of the torso is against the seat back, and that movement is restrained by the upper frame member.

In the first example embodiment of the invention, the second distance is greater than the first distance. Therefore, the movement of the upper portion of the torso can be restrained by the upper frame member after the head strikes the front surface of the headrest. Thus, the head can be inhibited from falling backward with respect to the upper portion of the torso. As a result, whiplash to the user can be suppressed. Also, because the second distance is greater than the first distance, the structure is able to be simpler than a structure in which the two distances are substantially the same, such as that described in JP-A-2007-507389, for example.

BRIEF DESCRIPTION OF DRAWINGS

The features, advantages, and technical and industrial significance of this invention will be described in the following detailed description of example embodiments of the invention with reference to the accompanying drawings, in which like numerals denote like elements, and wherein:

FIG. 5 is a left side view of a portion of the vehicle seat and the second dummy during a rear impact.

DETAILED DESCRIPTION OF EMBODIMENTS

Figure 1:
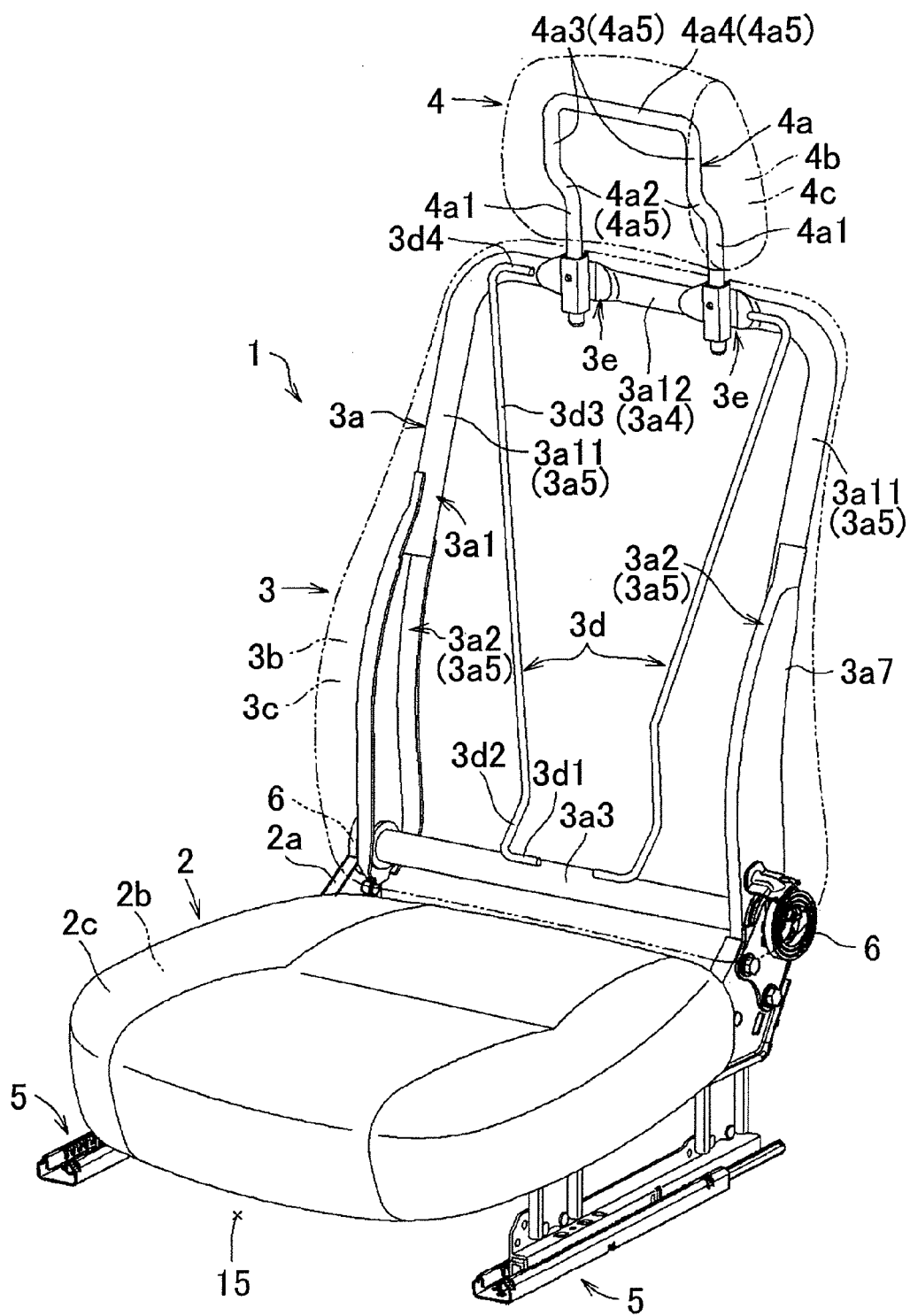
FIG. 1 is a perspective view of a vehicle seat.

Example embodiments of the invention will now be described with reference to FIGS. 1 to 6. As shown in FIG. 1, a seat 1 has a seat cushion 2, a seat back 3, and a headrest 4. The seat cushion 2, the seat back 3, and the headrest 4 each have a frame 2a to 4a, a pad 2b to 4b, and a cover 2c to 4c. The pads 2b to 4b are each formed of an elastic member and are attached to the frame 2a to 4a. The covers 2c to 4c are attached to the surfaces of the pads 2b to 4b.

The seat cushion 2 is mounted to the floor 15 of a vehicle such as an automobile via slide rails 5, as shown in FIG. 1. These slide rails 5 retain the seat cushion 2 in a manner such that the position of the seat cushion 2 can be adjusted in the front-rear direction with respect to the floor 15. The seat back 3 is attached to a rear portion of the seat cushion 2 via a reclining device 6 and is able to be placed in an upright position with respect to the seat cushion 2. The reclining device 6 pivotally attaches the seat back 3 to the seat cushion 2 and retains the seat back 3 in such a manner that the angle of the seat back 3 with respect to the seat cushion 2 can be adjusted.

A frame 3a of the seat back 3 has side panels 3a2, an upper pipe 3a1, and a lower frame member 3a3, as shown in FIG. 1. The lower frame member 3a3 is pipe-shaped and extends in the width direction at the lower portion of the seat back 3. The lower frame member 3a3 is positioned at the rotational axis of the seat back 3 with respect to the seat cushion 2. The side panels 3a2 are sheet-shaped and extend in the vertical direction at the lower portions of both side portions of the seat back 3. Therefore, the side panels 3a2 form the lower portions of side frame members 3a5 that extend vertically at both side portions of the seat back 3.

The upper pipe 3a1 has left and right upright portions 3a11 and a connecting portion 3a12 that are integrated with each other, as shown in FIG. 1. The upright portions 3a11 extend upward from the upper end portions of the side panels 3a2. Accordingly, the upright portions 3a11 form the upper portions of the side frame members 3a5. The connecting portion 3a12 extends in the width direction at the upper portion of the seat back 3 and connects the upper end portions of the pair of upright portions 3a11. Therefore, the connecting portion 3a12 forms an upper frame member 3a4 that extends in the width direction at the upper portion of the seat back 3. A pair of retaining portions 3e are fixed to the upper frame member 3a4, and the headrest 4 is mounted to these retaining portions 3e.

Figure 3:
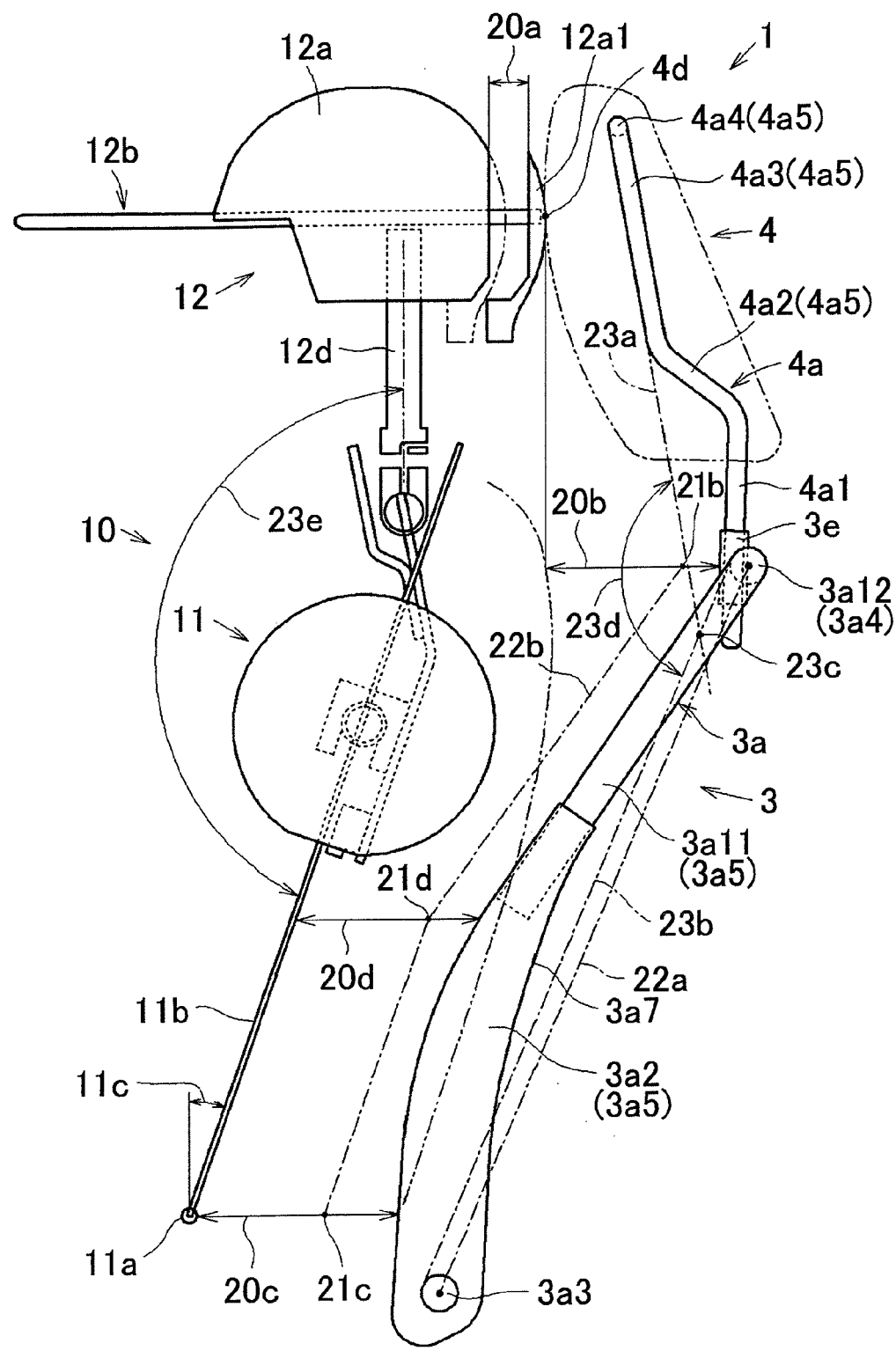
FIG. 3 is a left side view of a portion of the vehicle seat and the first dummy.

The headrest 4 is mounted to the upper portion of the seat back 3, as shown in FIGS. 1 and 3. A frame 4a of the headrest 4 is pipe-shaped and has a pair of stay portions 4a1 and an inner portion 4a5 that are integrated with each other. The stay portions 4a1 extend downward from the headrest main body and are retained by the retaining portions 3e. The inner portion 4a5 is arranged inside the headrest main body and has inclined portions 4a2, upper portions 4a3, and a connecting portion 4a4. The inclined portions 4a2 extend upward and forward from the upper end portions of the stay portions 4a1. The upper portions 4a3 extend upward and forward in a substantially straight line from the upper end portions of the inclined portions 4a2. The connecting portion 4a4 extends in the width direction along the upper portion of the headrest 4, and connects the upper end portions of the pair of upper portions 4a3.

Figure 2:
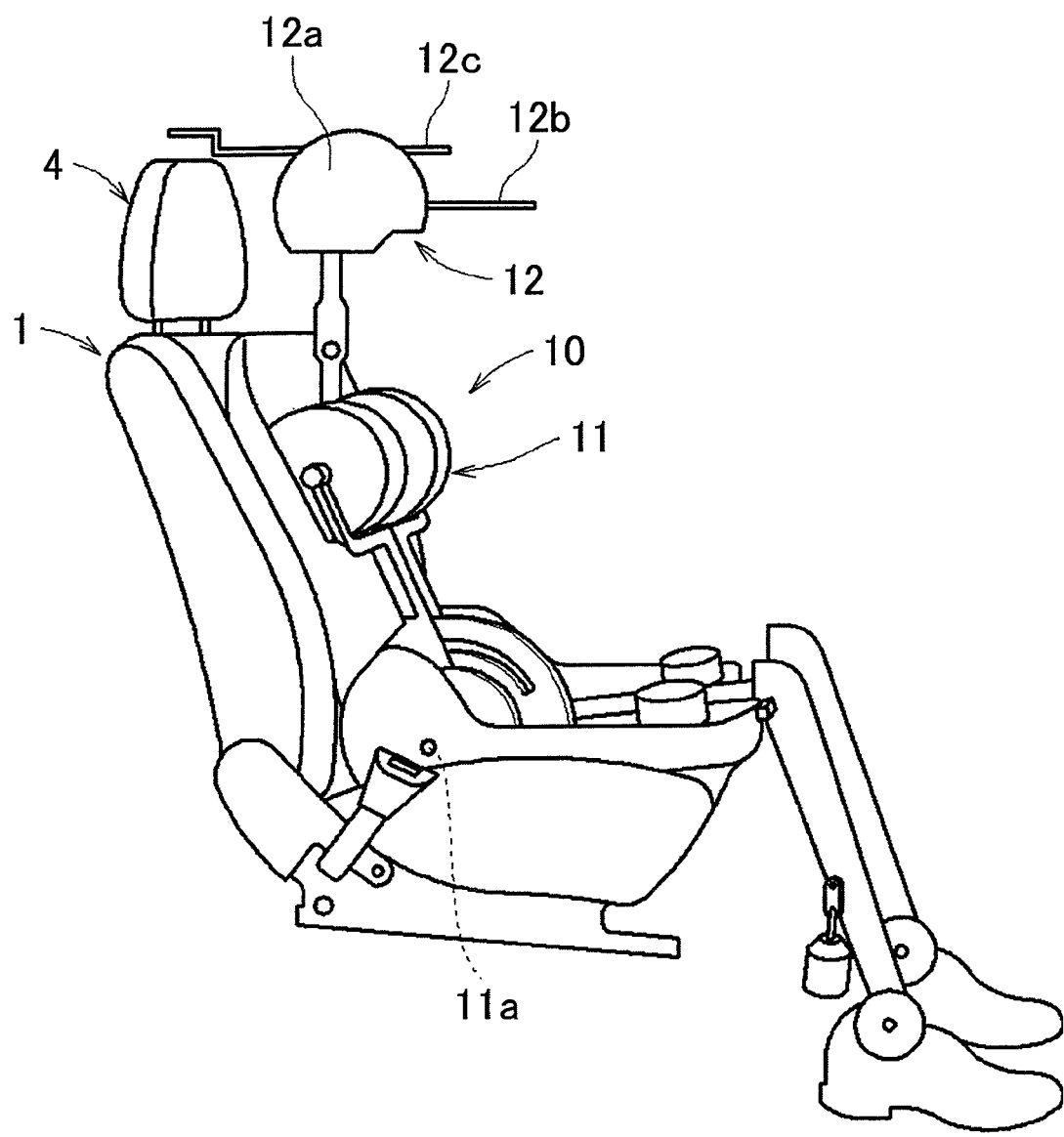
FIG. 2 is a perspective view of the vehicle seat and a first dummy.

As shown in FIGS. 2 and 3, a first dummy 10 is placed in the seat 1 in order to measure the shape of the seat 1. The first dummy 10 is formed of an H-point device (SAE 3-dimensional H-point machine) 11 and a head restraint measuring device (HRMD) 12. The H-point device 11 is a 3-dimensional manikin for measuring the H-point (hip point) 11a and the torso angle 11c.

As shown in FIG. 3, the H-point 11a is the center of rotation between the waist and the thighs of the first dummy 10. The torso angle 11c is the angle between a torso line 11b and a vertical line that passes through the H-point 11a of the first dummy 10. The torso line 11b is the center line when the first dummy 10 is placed in the farthest back position. When measuring the shape of the seat 1, the rearward reclining angle of the seat back 3 is adjusted so that the torso angle 11c is a predetermined angle. This predetermined torso angle 11c is an angle from 10° to 35° (e.g., 25°±1°) that is set according to the evaluation standards (such as E-NCAP) and laws or the like of each country, for example.

The HRMD 12 is a device for measuring the position of the headrest 4, as shown in FIGS. 2 and 3, and is made by ICBC, for example. This HRMD 12 has a head 12a, probes 12b and 12c that are attached to the head 12a, and a neck 12d that extends downward from the head 12a and attaches to the H-point device 11. The height of the head 12a is determined using, for example, a 50th percentile adult male as the reference. Accordingly, the position of the head 12a with respect to the H-point 11a is determined. The probe 12c is an instrument that measures the height of the headrest 4. The height of the headrest 4 is measured by the distance between the probe 12c and the top of the headrest 4.

The probe 12b is an instrument that measures the setback (i.e., a first distance 20a), as shown in FIG. 3. The setback is the horizontal distance between the back surface of the head 12a and the front surface of the headrest 4. The setback can be measured by moving the rear portion 12a1 of the head 12a horizontally until it abuts against a front surface first portion 4d of the headrest 4, and measuring that horizontal movement distance.

As shown in FIG. 3, the side frame members 3a5 of the seat back 3 are formed such that the front end edge of each side frame member 3a5 is a predetermined second distance 20b away from the torso line 11b at one predetermined position, a predetermined third distance 20c away from the torso line 11b at another predetermined position, and a predetermined fourth distance 20d away from the torso line 11b at yet another predetermined position. The second distance 20b is a horizontal distance (i.e., a distance in the front-rear direction) between the front surface first portion 4d of the headrest 4 and a front surface of the upper frame member 3a4 that is located farther to the rear than the front surface first portion 4d. Preferably, the second distance 20b is greater than the first distance 20a, and even more preferably, the first distance 20a+120 mm is greater than the second distance 20b, and the second distance 20b is greater than the first distance 20a+15 mm.

The third distance 20c is a horizontal distance between the H-point 11a and the front end edge of the side frame member 3a5, as shown in FIG. 3. Preferably, the first distance 20a+120 mm is greater than the third distance 20c, and the third distance 20c is greater than the first distance 20a+15 mm. The fourth distance 20d is the horizontal distance between a waist height position of the torso line 11b and the front end edge of the side frame member 3a5. Preferably, the first distance 20a+120 mm is greater than the fourth distance 20d, and the fourth distance 20d is greater than the first distance 20a+15 mm. The waist height is a height 150±100 mm (such as 200 mm) above the H-point 11a.

The side frame member 3a5 is formed such that the front end edge is positioned between a first line 22a and a second line 22b, as shown in FIG. 3. The first line 22a is a line that connects the center of the upper frame member 3a4 with the center of the lower frame member 3a3. The second line 22b is a line that connects a second reference position 21b with a fourth reference position 21d and a third reference position 21c.

The second reference position 21b is positioned at the same height as the upper frame member 3a4 and is the first distance 20a+15 mm behind the front surface first portion 4d of the headrest 4, as shown in FIG. 3. The fourth reference position 21d is positioned the first distance 20a+15 mm behind the waist height position of the torso line 11b. The third reference position 21c is positioned the first distance 20a+15 mm behind the H-point 11a.

The rear end edge of each side frame member 3a5 is bow-shaped with a concave portion 3a7 formed in the center portion, as shown in FIG. 3. The concave portion 3a7 curves forward in front of the first line 22a. Therefore, this concave portion 3a7 provides more space behind the seat 1. The space behind the seat 1 provided by the concave portion 3a7 increases with a thinner seat back 3.

The frame 4a of the headrest 4 is formed such that a line of intersection 23c between a first plane 23a and a second plane 23b is positioned farther forward than the upper frame member 3a4, as shown in FIG. 3. The first plane 23a is an extended plane of the front surface of the upper portion 4a3. The second plane 23b is a plane that contacts the front surface of the upper frame member 3a4 and the front surface of the lower frame member 3a3. The structure is preferably such that the line of intersection 23c is positioned 5 to 100 mm in front of the upper frame member 3a4 and the retaining portion 3e.

Also, the frame 4a is structured such that a first angle 23d is less than a second angle 23e, as shown in FIG. 3. The first angle 23d is the angle between the first plane 23a and the second plane 23b. The second angle 23e is the angle between the center line of the neck 12d and the torso line 11b of the first dummy 10 seated in the seat 1. The frame 4a is preferably structured such that the first angle 23d is 5 to 30° less than the second angle 23e.

Figure 4:
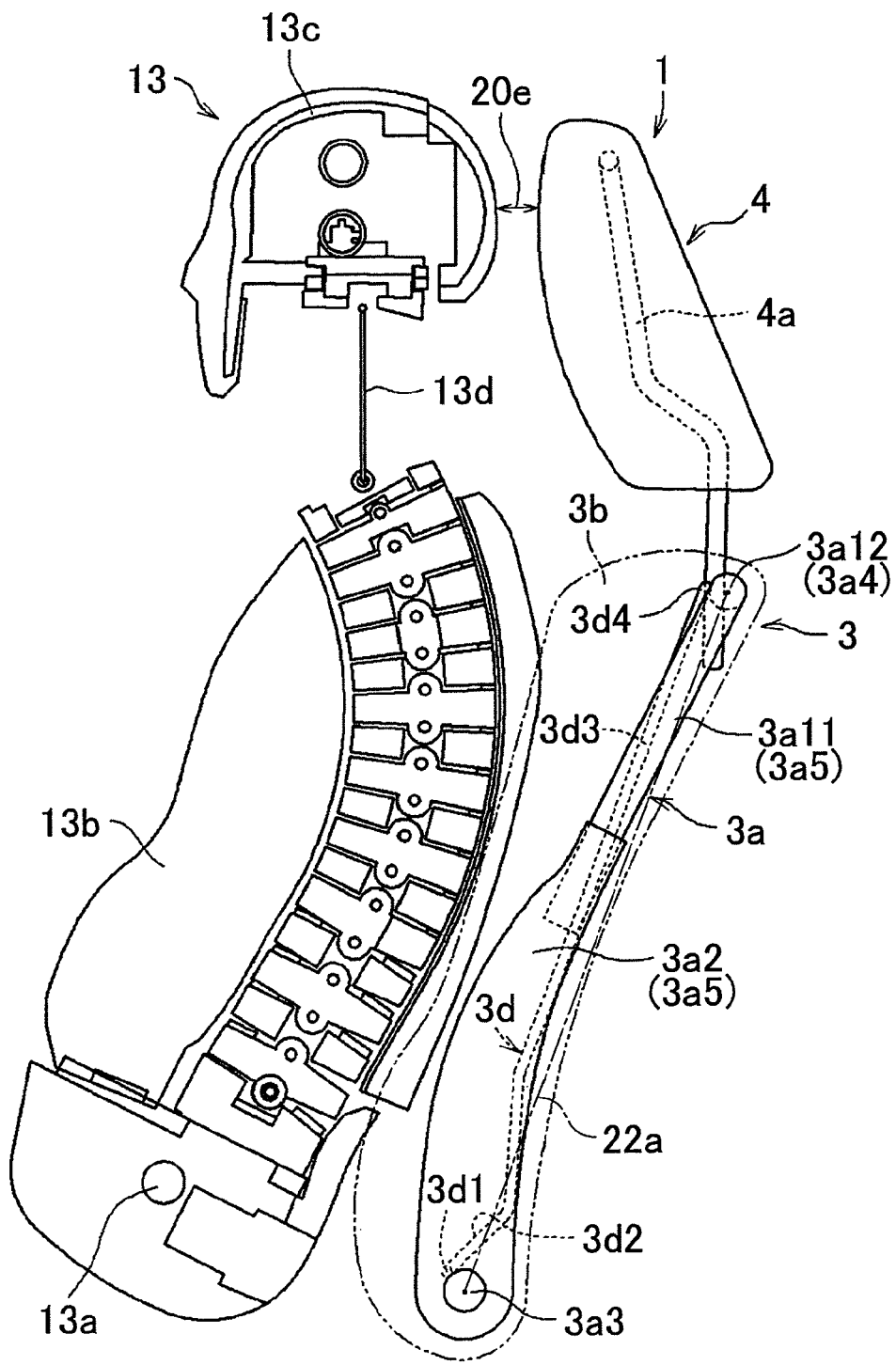
FIG. 4 is a left side view of a portion of the vehicle seat and a second dummy.

As shown in FIGS. 1 and 4, a plurality (such as two) of wires 3d are provided between the upper frame member 3a4 and the lower frame member 3a3. These wires 3d are elastically deformable metal rods that elastically support the back surface of the pad 3b. Wire lower portions 3d1 are fixed by welding or the like to the surface of the lower frame member 3a3 and are positioned forward of the center of the lower frame member 3a3. Wire upper portions 3d4 are fixed by welding or the like to the surface of the upper frame member 3a4 and are positioned forward of the center of the upper frame member 3a4.

The wires 3d each have a wire main body 3d3 that extends between the lower frame member 3a3 and the upper frame member 3a4, as shown in FIGS. 1 and 4. Each wire main body 3d3 has a rearward extending portion 3d2 that extends toward the rear near the wire lower portion 3d1.

When performing a rear impact test (i.e., a test when subjecting a vehicle to an impact from behind), a second dummy 13 shown in FIG. 4, instead of the first dummy 10 shown in FIG. 3, is placed in the seat 1. This second dummy 13 is a BioRID-II, for example, and has a torso 13b and a head 13c. The torso 13b has an H-point 13a, and this H-point 13a is aligned with the H-point 11a shown in FIG. 3.

The head 13c is attached to the torso 13b via a neck 13d, as shown in FIG. 4. The head 13c is placed such that the distance between the rear surface of the head 13c and the front surface of the headrest 4 is a placement distance 20e. This placement distance 20e is set to the first distance 20a+15 mm, taking into account the posture and the like of the user. Accordingly, the posture and position of the second dummy 13 with respect to the seat 1 is set.

During a rear impact, inertia force causes the second dummy 13 to move substantially horizontally (rearward) relative to the seat 1, as shown in FIGS. 4 and 5. The head 13c moves from an initial position in front of the headrest 4 toward the front surface of the headrest 4 and strikes the front surface of the headrest 4. The head 13c closely contacts the frame 4a while deforming the pad 4b. The torso 13b moves from an initial position in which a portion of the torso 13b is against seat back 3 toward the rear with respect to the seat back 3 while deforming the pad 3b.

Figure 6:
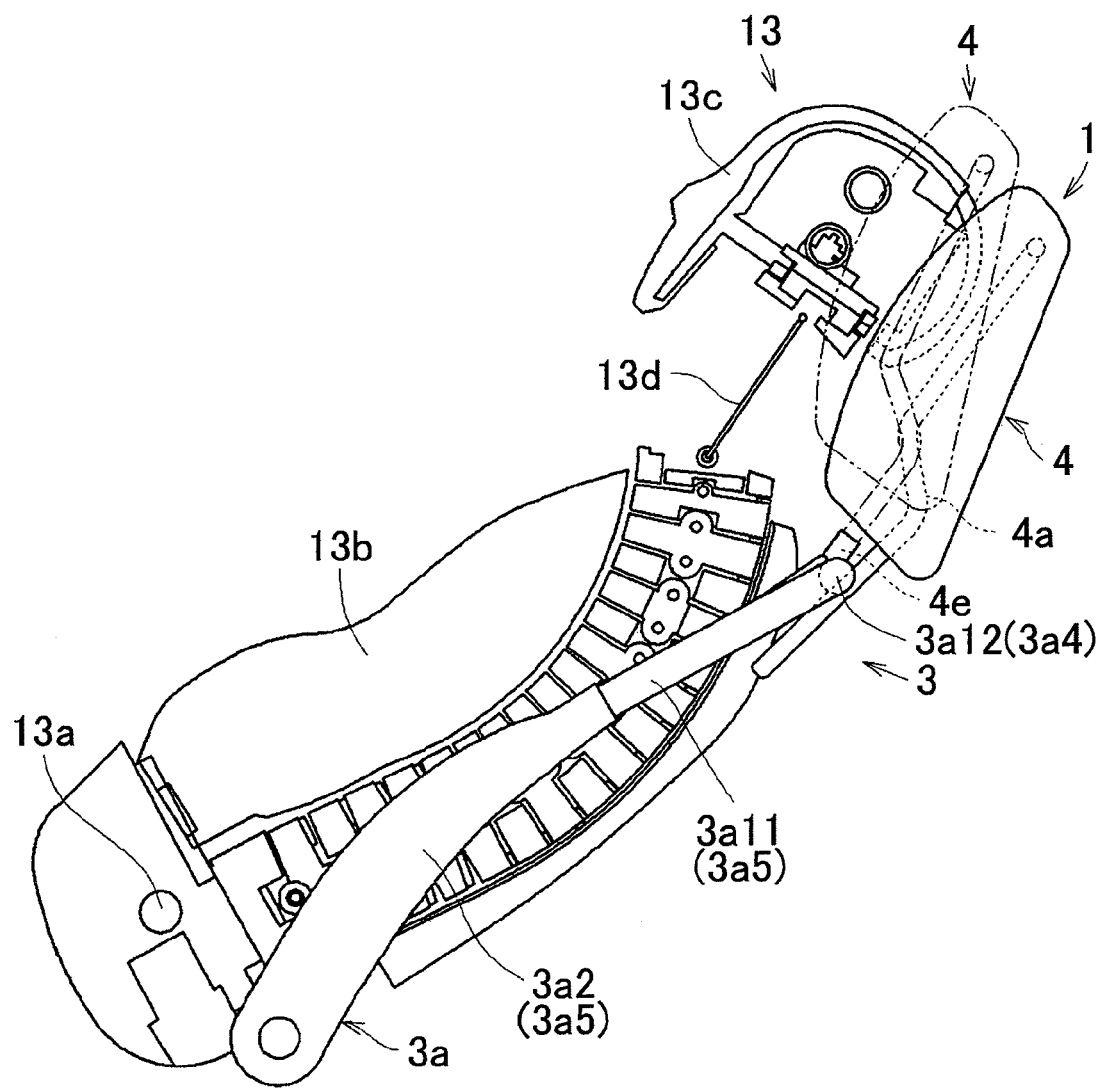
FIG. 6 is a left side view of a portion of the vehicle seat and the second dummy during a high rear impact.

When the vehicle is struck from the rear with even greater force, movement of the head 13c is restrained by the upper portions 4a3 and the connecting portion 4a4 of the frame 4a, as shown in FIGS. 5 and 6. Beyond this, the frame 4a deforms as it is pushed by the head 13c. Movement of the upper portion of the torso 13b is restrained by the upper frame member 3a4. Beyond this, the upper frame member 3a4 is pushed by the torso 13b and the side frame members 3a5 deform.

Movement of the waist and the buttocks of the torso 13b is restricted by the side frame members 3a5. More specifically, the torso 13b moves while deforming the pad 3b and the cover 3c of the seat back 3 arranged between the side frame members 3a5. Then when the center line (i.e., a line corresponding to the spine) of the waist and buttocks goes beyond the front end edges of the side frame members 3a5 and moves between the side frame members 3a5, the movement of the waist and buttocks is forcibly restricted by the side frame members 3a5 via the pad 3b and the cover 3c. Beyond this, the side frame members 3a5 are able to deform.

The frames 3a and 4a are structured such that the first distance 20a to the fourth distance 20d have the relationship described above, as shown in FIG. 3. Therefore, during a rear impact, the head 13c strikes the headrest 4 first. Then the movement of the upper portion of the torso 13b is restrained by the upper frame member 3a4, and the waist and buttocks of the torso 13b are restricted by the side frame members 3a5 and the pad 3b working together.

The line of intersection 23c is positioned farther forward than the upper frame member 3a4, as shown in FIG. 3. Accordingly, the upper portion 4a3 of the frame 4a is positioned farther forward than the upper frame member 3a4. Therefore, during a rear impact, the movement of the head 13c is restrained by the upper portion 4a3 of the frame 4a. Then, the frame 4a is pushed back by the head 13c, and tilts backward with respect to the seat back 3. As a result, the first angle 23d increases.

The frame 4a is structured such that the first angle 23d is less than the second angle 23e. Therefore, the first angle 23d of the frame 4a with respect to the seat back 3 approaches the second angle 23e. Thus, even if the frame 4a is tilted backward with respect to the seat back 3, the head 13c is still able to be inhibited from falling backward with respect to the torso (i.e., the torso line 11b). Hence, the difference in the angle of the head of the user with respect to the torso before and after a rear impact is less, so whiplash to the user is able to be inhibited (see FIGS. 4 and 6).

As shown in FIG. 3, the upper frame member 3a4 and the headrest 4 are structured such that the second distance 20b is greater than the first distance 20a. Therefore, the distance between the head of the user seated in the seat 1 and the headrest 4 can be assumed by the first distance 20a. That is, the head 12a of the HRMD 12 can be assumed to be the head of the user seated in the seat 1. The distance between the upper portion of the torso of the user and the upper frame member 3a4 is determined by the second distance 20b. That is, the back surface of the upper portion of the torso of the user is substantially equal to the position in the front-rear direction of the front surface first portion 4d of the headrest 4. Therefore, the second distance 20b can be assumed to be the distance between the upper frame member 3a4 and the back surface of the upper portion of the torso.

During a rear impact, inertia force causes the user to move substantially horizontally (backward) relative to the seat 1. Therefore, the head of the user moves from an initial position in front of the headrest 4 and strikes the front surface of the headrest 4. The torso of the user moves backward from an initial position in which a portion of the torso is against the seat back 3, and that movement is restrained by the upper frame member 3a4.

In this example embodiment, the second distance 20b is greater than the first distance 20a. Therefore, the movement of the upper portion of the torso can be restrained by the upper frame member 3a4 after the head strikes the front surface of the headrest 4. As a result, whiplash to the user can be suppressed. Also, because the second distance 20b is greater than the first distance 20a, the structure is able to be simpler than a structure in which the two distances are substantially the same, such as that described in JP-A-2007-507389, for example.

Also, the upper frame member 3a4 and the headrest 4 are preferably structured such that the second distance 20b is greater than the first distance 20a+15 mm, as shown in FIG. 3. Therefore, during a rear impact, the head of the user is able to reliably strike the headrest 4 before the movement of the upper portion of the torso of the user is restrained by the upper frame member 3a4. The reason having the first distance 20a+ 15 mm is because the placement distance 20e shown in FIG. 4 is taken into account. That is, in the rear impact test, the head 13c of the dummy 13 is placed the first distance 20a+15 mm in front of the headrest 4 taking into account the seated position of the user and the like. Having the second distance 20b be greater than the first distance 20a+15 mm effectively inhibits the head 13c of the dummy 13 from falling backward with respect to the torso 13b. This result was able to be confirmed by the rear impact test.

Also, the side frame members 3a5 are structured such that the third distance 20c is greater than the first distance 20a+15 mm, as shown in FIG. 3. Therefore, the relationship of the distance between the side frame members 3a5 and the buttocks of the user can be assumed by the third distance 20c. That is, the H-point 11a can be assumed to be the buttocks of the user seated in the seat 1. Also, the structure is such that the third distance 20c is greater than the first distance 20a+15 mm, so during a rear impact, movement of the buttocks is forcibly restricted by the side frame members 3a5 after the head of the user strikes the front surface of the headrest 4. As a result, the head is inhibited from falling backward with respect to the torso, so whiplash to the user can be suppressed.

Also, the side frame members 3a5 are structured such that the fourth distance 20d is greater than the first distance 20a+15 mm, as shown in FIG. 3. Therefore, the relationship of the distance between the side frame members 3a5 and the waist of the user can be assumed by the fourth distance 20d. That is, the waist height position of the torso line 11b can be assumed to be the waist of the user. Also, the structure is such that the fourth distance 20d is greater than the first distance 20a+15 mm, so during a rear impact, movement of the waist is forcibly restricted by the side frame members 3a5 after the head of the user strikes the front surface of the headrest 4. As a result, the head is inhibited from falling backward with respect to the torso, so whiplash to the user can be suppressed.

Also, the front end edges of the side frame members 3a5 are positioned in front of the first line 22a and behind the second line 22b, as shown in FIG. 3. Therefore, during a rear impact, the head of the user strikes the headrest 4 first. Then the movement of the upper portion of the torso of the user is restrained by the upper frame member 3a4, and movement of the buttocks and waist is restricted by the side frame members 3a5.

Also, the upper portions 4a3 of the frame 4a are structured such that the first angle 23d is less than the second angle 23e−5°, as shown in FIG. 3. Therefore, even if the frame 4a is tilted 5° back with respect to the seat back 3, the neck of the user can still be inhibited from falling backward with respect to the torso. Thus, it can be preferably suppressed that the user suffers whiplash.

During a rear impact, inertia force causes the weight of the user to be applied to the seat back 3. On the other hand, the wire lower portions 3d1 are attached to the lower frame member 3a3 at locations on the front side with respect to the center of the lower frame member 3a3 from the side view, and the wire upper portions 3d4 are attached to the upper frame member 3a4 at locations on the front side with respect to the center of the upper frame member 3a4 from the side view, as shown in FIG. 4. Therefore, when force from the pad 3b is applied from the front toward the rear to the wire lower portions 3d1 and the wire upper portions 3d4, the wire lower portions 3d1 and the wire upper portions 3d4 are pushed against the lower frame member 3a3 and the upper frame member 3d4, respectively, and are thus able to be inhibited from detaching from the lower frame member 3a3 and the upper frame member 3a4.

Also, the wires 3d have the rearward extending portions 3d2, as shown in FIG. 4. Therefore, during a rear impact, movement of the torso of the user toward the seat back 3 side tends not to be impeded by the wires 3d, so the torso of the user moves smoothly toward the seat back 3 side. Thus, whiplash to the user that may occur due to the movement of the torso being restricted before the head is restrained can be suppressed.

Moreover, the rearward extending portions 3d2 of the wires 3d extend behind the first line 22a, as shown in FIG. 4, so the wire main bodies 3d3 are positioned sufficiently behind the upper frame member 3a4 and the lower frame member 3a3. As a result, during a rear impact, the user is able to reliably move backward with respect to the seat back 3, without being impeded by the wires 3d.

Modified Examples

The invention is not limited to the example embodiments described above, but may also be carried out in other modes such as those described below.

(1) The upper frame member 3a4 of the seat back 3 shown in FIG. 1 is pipe-shaped, but it may also be plate-shaped or the like.

(2) The inner portion 4a5 of the headrest 4 shown in FIG. 1 is pipe-shaped, but it may also be plate-shaped or the like.

(3) The upper portion 4a3 of the headrest 4 shown in FIG. 3 is straight, but it may also be curved. The first plane 23a when the upper portion is curved may be determined by a plane that passes through the front surface at the uppermost portion of the upper portion and the foremost surface of the upper portion.

(4) The wires 3d shown in FIG. 4 have the rearward extending portions 3d2 that extend curving backward near the wire lower portions 3d1. However, the wires may also have rearward extending portions that extend curving backward near the center portions of the wire main bodies or near the wire upper portions. Alternatively, the wire main bodies may be bow-shaped, and rearward extending portions may be formed along substantially the entire length of the wire main bodies.

(5) The seat 1 shown in FIG. 1 is mounted in a vehicle such as an automobile, but it may also be mounted in a marine vessel or an aircraft or the like.

What is claimed is:

1. A vehicle seat comprising:
   a seat cushion;
   a seat back that stands upright with respect to the seat cushion; and
   a headrest that attaches to an upper portion of the seat back, wherein
   the seat back has an upper frame member that extends in the width direction at an upper portion, and the upper frame member and the headrest are structured such that a second distance is greater than a first distance,
   the first distance is a horizontal positive distance, between a front surface first portion of the headrest and a head of a head restraint measuring device that is attached to an H-point device positionable in the seat, that has been measured by the head restraint measuring device,
   the second distance is a horizontal distance between the front surface first portion of the headrest and a front surface of the upper frame member that is positioned to the rear of the front surface first portion, and
   a rear-most portion of the head is vertically aligned with a forward-most portion of the headrest.

2. The vehicle seat according to claim 1, wherein
   the upper frame member and the headrest are structured such that the second distance is greater than the first distance +15 mm.

3. The vehicle seat according to claim 2, wherein
the seat back has a side frame member that extends vertically at both side portions, and a lower frame member that extends in the width direction at a lower portion and connects the side frame members,
a front end edge of the side frame member is positioned in front of a first line and behind a second line,
the first line is a line that connects the center of the upper frame member and the center of the lower frame member together, and the second line is a line that connects a second reference position, a fourth reference position, and a third reference position together,
the second reference position is positioned the first distance +15 mm in back of the front surface first portion of the headrest and at the same height as the upper frame member,
the fourth reference position is positioned the first distance +15 mm in back of the waist height position of the torso line of the H-point device, and
the third reference position is positioned the first distance +15 mm in back of the H-point of the H-point device.

4. The vehicle seat according to claim 1, wherein
the seat back has a side frame member that extends vertically at both side portions,
the side frame member is structured such that a third distance is greater than the first distance +15 mm, and
the third distance is a horizontal distance between an H-point of the H-point device and a front end edge of the side frame member.

5. The vehicle seat according to claim 4, wherein
the seat back has a side frame member that extends vertically at both side portions, and a lower frame member that extends in the width direction at a lower portion and connects the side frame members,
a front end edge of the side frame member is positioned in front of a first line and behind a second line,
the first line is a line that connects the center of the upper frame member and the center of the lower frame member together, and the second line is a line that connects a second reference position, a fourth reference position, and a third reference position together,
the second reference position is positioned the first distance +15 mm in back of the front surface first portion of the headrest and at the same height as the upper frame member,
the fourth reference position is positioned the first distance +15 mm in back of the waist height position of the torso line of the H-point device, and
the third reference position is positioned the first distance +15 mm in back of the H-point of the H-point device.

6. The vehicle seat according to claim 1, wherein
the seat back has a side frame member that extends vertically at both side portions,
the side frame member is structured such that a fourth distance is greater than the first distance +15 mm, and
the fourth distance is a horizontal distance between a waist height position of a torso line of the H-point device and a front end edge of the side frame member.

7. The vehicle seat according to claim 6, wherein
the seat back has a side frame member that extends vertically at both side portions, and a lower frame member that extends in the width direction at a lower portion and connects the side frame members,
a front end edge of the side frame member is positioned in front of a first line and behind a second line,
the first line is a line that connects the center of the upper frame member and the center of the lower frame member together, and the second line is a line that connects a second reference position, a fourth reference position, and a third reference position together,
the second reference position is positioned the first distance +15 mm in back of the front surface first portion of the headrest and at the same height as the upper frame member,
the fourth reference position is positioned the first distance +15 mm in back of the waist height position of the torso line of the H-point device, and
the third reference position is positioned the first distance +15 mm in back of the H-point of the H-point device.

8. The vehicle seat according to claim 1, wherein
the seat back has a side frame member that extends vertically at both side portions, and a lower frame member that extends in the width direction at a lower portion and connects the side frame members,
a front end edge of the side frame member is positioned in front of a first line and behind a second line,
the first line is a line that connects the center of the upper frame member and the center of the lower frame member together, and the second line is a line that connects a second reference position, a fourth reference position, and a third reference position together,
the second reference position is positioned the first distance +15 mm in back of the front surface first portion of the headrest and at the same height as the upper frame member,
the fourth reference position is positioned the first distance +15 mm in back of the waist height position of the torso line of the H-point device, and
the third reference position is positioned the first distance +15 mm in back of the H-point of the H-point device.

9. The vehicle seat according to claim 1, wherein a back surface of an upper portion of a torso of the H-point device is substantially the same as the position in the front-rear direction of the front surface first portion of the headrest.

10. A vehicle seat comprising:
a seat cushion;
a seat back that stands upright with respect to the seat cushion; and
a headrest that attaches to an upper portion of the seat back, wherein
the seat back has an upper frame member that extends in the width direction at an upper portion, and the upper frame member and the headrest are structured such that a second distance is greater than a first distance,
the first distance is a horizontal positive distance, between a front surface first portion of the headrest and a head of a head restraint measuring device that is attached to an H-point device positionable in the seat, that has been measured by the head restraint measuring device,
the second distance is a horizontal distance between the front surface first portion of the headrest and a front surface of the upper frame member that is positioned to the rear of the front surface first portion,
the seat back has a side frame member that extends vertically at both side portions, and a lower frame member that extends in the width direction at a lower portion and connects the side frame members together, and
a concave portion that curves forward in front of a first line that connects the center of the upper frame member and the center of the lower frame member together is provided on a rear end edge of the side frame member.

* * * * *